(No Model.)

E. KELLY.
LAWN MOWER.

No. 377,562. Patented Feb. 7, 1888.

WITNESSES
S. L. Schrader
Edwin Sauter

INVENTOR
Ernest Kelly
Paul Bakewell,
his attorney.

UNITED STATES PATENT OFFICE.

ERNEST KELLY, OF ST. LOUIS, MISSOURI.

LAWN-MOWER.

SPECIFICATION forming part of Letters Patent No. 377,562, dated February 7, 1888.

Application filed May 13, 1887. Serial No. 238,031. (No model.)

*To all whom it may concern:*

Be it known that I, ERNEST KELLY, a citizen of the United States, residing at the city of St. Louis, State of Missouri, have invented a certain new and useful Improvement in Lawn-Mowers, of which the following is a full, clear, and exact description.

Figure 1:
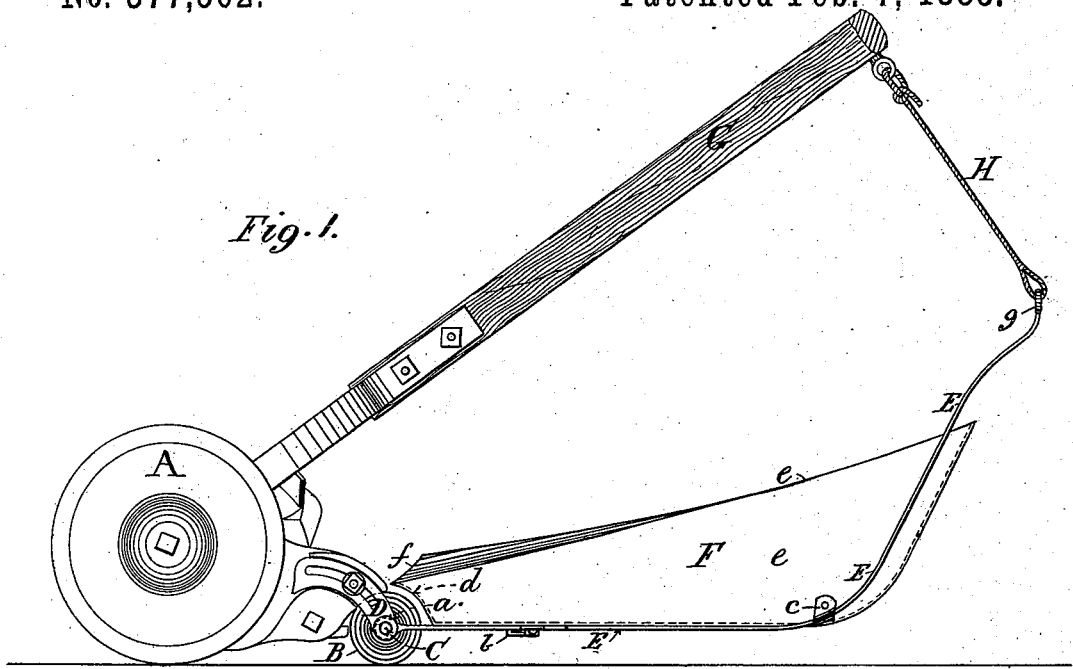
Figure 2:
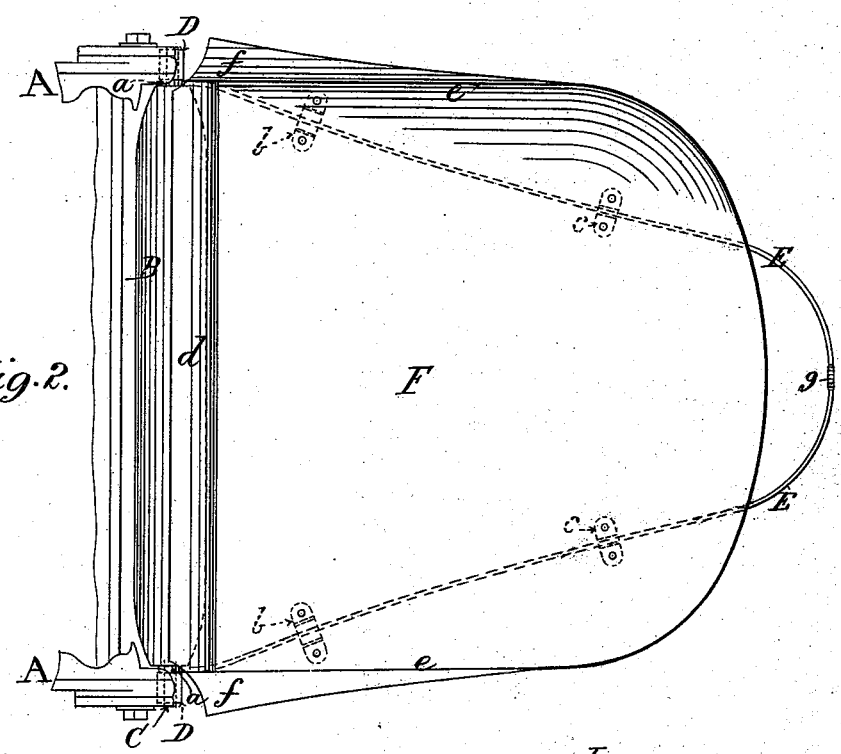

On the accompanying drawings, Figures 1 and 2 are a side elevation and part plan, respectively, of a lawn-mower fitted with my invention, like letters of reference denoting like parts in both figures.

A represents a lawn-mower, provided in this case with a rear roller, B, the spindle C of which is mounted in adjustable side bearings, D, in the ordinary manner. On the spindle C, between each end of the roller B and its side bearing, D, is passed the eye $a$ of a rod or wire, E, which extends backward to a suitable length for supporting a tray or pan, F, made of any desired shape and depth, the bottom of the tray or pan F resting on the two rods or wires E, and secured thereto by clamps $b$ and $c$. The front end, $d$, of the tray or pan F is located over and in line with the rear roller, B, of the mower A, a suitable space being left between the end $d$ and the roller B to allow of the free action of the latter. The sides $e$ of the tray or pan F may be formed on their upper edges with outwardly-flaring lips or flanges $f$, diminishing in width toward the rear of the tray or pan F, from the bottom of which the rods or wires E extend upward externally along the back, and to a suitable distance above the tray or pan F, where they terminate in a single loop or eye, $g$, which is connected to the handle G (broken away in Fig. 1) of the lawn-mower A by a chain or cord, H, so that the level or position of the tray or pan F can be regulated at pleasure.

By the device above described as the lawn-mower A, and with it the tray or pan F, is propelled by the handle G the cut grass thrown upward by the revolving cutters to the rear of the mower is caught while falling by the tray or pan F, in which it is collected instead of falling onto the lawn, as at present. A considerable saving of time and labor in removing the grass is thus effected, and the injury to the lawn caused by the use of rakes entirely prevented.

If desired, on disconnecting the rear roller, B, and its spindle C from the mower A, in the usual manner, and springing apart the rods or wires E, the end eyes, $a$, of the latter can be unhitched from the spindle C and the tray or pan F removed.

I claim as my invention—

In a lawn-mower, the combination, with the roller B and its spindle C, of rods or wires E, provided with eyes $a$, adapted to encircle the spindle C between the ends of the roller B and its bearings D, said wires E carrying tray or pan F, and connected to handle G by chain or cord H, substantially as shown, and for the purpose described.

In testimony whereof I affix my signature, in presence of two witnesses, this 10th day of May, 1887.

ERNEST KELLY.

Witnesses:
S. L. SCHRADER,
EDWIN SAUTER.